(12) United States Patent
Kwon et al.

(10) Patent No.: US 11,081,702 B2
(45) Date of Patent: Aug. 3, 2021

(54) SYNTHESIS METHOD OF METAL CATALYST HAVING CARBON SHELL USING METAL COMPLEX

(71) Applicant: INCHEON UNIVERSITY INDUSTRY ACADEMIC COOPERATION FOUNDATION, Incheon (KR)

(72) Inventors: Oh Joong Kwon, Incheon (KR); Mohanraju Karuppannan, Incheon (KR)

(73) Assignee: INCHEON UNIVERSITY INDUSTRY ACADEMIC COOPERATION FOUNDATION, Incheon (KR)

( * ) Notice: Subject to any disclaimer, the term of this patent is extended or adjusted under 35 U.S.C. 154(b) by 197 days.

(21) Appl. No.: 16/105,999

(22) Filed: Aug. 21, 2018

(65) Prior Publication Data

US 2019/0326606 A1    Oct. 24, 2019

(30) Foreign Application Priority Data

Apr. 18, 2018 (KR) .................. 10-2018-0045202

(51) Int. Cl.
  *H01M 4/86* (2006.01)
  *H01M 4/92* (2006.01)
  *H01M 4/90* (2006.01)

(52) U.S. Cl.
  CPC ....... *H01M 4/8663* (2013.01); *H01M 4/9075* (2013.01); *H01M 4/92* (2013.01); *H01M 2004/8689* (2013.01)

(58) Field of Classification Search
  CPC .... H01M 4/9008; H01M 4/9075; H01M 4/92; H01M 4/925; B01J 35/0086
  See application file for complete search history.

(56) References Cited

U.S. PATENT DOCUMENTS

| 2008/0161183 | A1* | 7/2008 | Popov ............... H01M 4/9083 502/101 |
| 2011/0177937 | A1* | 7/2011 | Hwang ............... B01J 31/1815 502/167 |
| 2014/0186253 | A1* | 7/2014 | Kitagawa ............... C08K 3/08 423/362 |
| 2016/0240860 | A1* | 8/2016 | Strasser ............... B01J 23/8892 |
| 2018/0254490 | A1* | 9/2018 | Yoo ................ H01M 4/9083 |

FOREIGN PATENT DOCUMENTS

KR     10-1828175 B1    2/2018

OTHER PUBLICATIONS

Machine translation of Lee (KR101828175B1), publication date Feb. 12, 2018.*

* cited by examiner

*Primary Examiner* — Jun Li
(74) *Attorney, Agent, or Firm* — Revolution IP, PLLC

(57) ABSTRACT

A synthesis method of a metal catalyst having carbon shell, includes: a) forming a metal-ligand complex without further chemical additives by mixing a ligand with a metal precursor; b) separating the metal-ligand complex and collecting the separated metal-ligand complex; c) supporting the collected metal-ligand complex to a support by mixing the collected metal-ligand complex with the support in a solvent; and d) treating a composite consisting of the metal-ligand complex and the support by heating.

15 Claims, 11 Drawing Sheets

SYNTHESIS METHOD OF METAL CATALYST HAVING CARBON SHELL USING METAL COMPLEX

FIELD OF THE INVENTION

The present invention is relevant to synthesis method of metal catalyst having carbon shell, more specifically, synthesis method of metal catalyst having carbon shell using metal-ligand metal complex, in which a liquid ligand and a metal precursor are mixed and thus metal complex is formed, and the metal-ligand complex is separated and mixed with a support, and the separated metal complex is immersed into the support, and then the ligand is carbonized by heat treatment, and thereby an excellent durable catalyst in which carbon shell coats around a metal can be synthesized without chemical additives in a simple process and carbon shell can be optionally coated evenly onto a metal.

A catalyst synthesized by the present invention has a high durability due to carbon shell when comparing to other metal catalysts and thus can be applied to varied areas requiring high durable catalyst, and can be significantly utilized particularly as a catalyst for a low-temperature operational fuel cell such as PEMFC when using a metal applied to a fuel cell.

BACKGROUND OF THE INVENTION

A fuel cell is a device transforming chemical energy to electrical energy and does not cause environmental pollutants. Therefore, it is next-generation device for producing energy. Particularly, polymer electrolyte membrane fuel cell or proton exchange membrane fuel cell (PEMFC) capable of operating at low temperature was applied to electric vehicles and thus lead to successful manufacture of an environment-friendly vehicle not emitting environmental pollutants and commercialization of the vehicle is already completed.

However, there are several issues to be resolved in PEMFC. Price is the most important issue of them, and the most proportion of price determinants is a catalyst. A catalyst for chemical reaction in PEMFC is essential because the PEMFC should be operated at low temperature, and Pt used as a catalyst in PEMFC is a kind of precious metal and thereby causes increased price of PEMFC.

Despite the price, the reason why Pt is used in PEMFC is because the best material for oxygen reduction reaction (ORR) in cathode of PEMFC is Pt. The oxygen reduction reaction is slower than Hydrogen oxidation reaction (HOR) made in anode and thus the reaction determines overall performance of PEMFC.

Therefore, the usage of Pt should be decreased by development of Pt catalyst with excellent activity to oxygen reduction reaction and high durability for lowering price of PEMFC.

A Pt/C catalyst is used as a catalyst in PEMFC currently, where Pt is immersed onto carbon black with large surface.

However, such existing catalysts have several drawbacks in view of commercialization of PEMFC. Particularly, carbon support is corroded and Pt is detached or relocated, and thereby aggregated in operation of PEMFC. As a result, Pt particles is bulked up and thus durability is low. The loss of Pt catalytic activity is higher in cathode (oxygen reduction reaction) than in anode (hydrogen oxidation reaction) because nano particle of Pt faces to critical condition in cathode than in anode.

Some solutions have been provided in order to resolve the problems. One of the solutions is to form a protection layer coating a catalyst with carbon material. The method is provided for improving durability of the catalyst, where aggregation of Pt caused by Pt movement is prohibited because carbon shell coating a catalyst protects Pt physically.

Varied methods for synthesizing a metal catalyst with carbon shell were reported and synthesized catalysts show improved durability when compared to commercial catalysts.

The inventor in the present invention disclosed a synthesis method of metal catalyst having carbon shell in KR Patent 10-1828175 as a prior art, comprising: a) forming metal-aniline complex without further chemical additives by mixing a pure aniline monomer used as a carbon shell with a metal precursor used as a metal catalyst; b) adding a support material operated as a support to a reactor where the complex is formed and supporting the complex into the support through ultrasound irradiation; c) terminating the reaction after pause and separating a synthesized material through a filter and collecting the material; and d) altering an aniline portion to a carbon shell by carbonizing the aniline portion through heat treatment and making thermal reduction of the metal precursor.

The synthesis method uses a Pt-aniline complex and an aniline monomer and thus cause a problem by comprising Pt-aniline complex as well as aniline monomer and polyaniline, not using Pt-aniline complex when forming a carbon shell for improving durability of Pt catalyst.

PRIOR ARTS

Patents (Patent 001) Patent No. 10-1828175(KR)

DETAILED DESCRIPTION OF THE INVENTION

Problems to be Solved

The present invention aims to solve the existing problems of the prior art and to develop an excellent catalyst with improved durability. Technical goal of the present invention is to provide a new method for simplifying the existing complicated method through a new method and coating a carbon selectively to a metal, not using chemical additives such as reducing agents and polymerizing agents.

Solution

In order to solve the problem, the present invention provides a synthesis method of a metal catalyst having carbon shell, comprising: a) forming a metal-ligand complex without further chemical additives by mixing a ligand with a metal precursor; b) separating the metal-ligand complex and collecting the separated metal-ligand complex; c) supporting the collected metal-ligand complex to a support by mixing the collected metal-ligand complex with the support in a solvent; and d) treating a composite consisting of the metal-ligand complex and the support by heating.

In another aspect of the present invention, the present invention provides a metal catalyst with high durability (particularly metal catalyst for fuel cell), which has carbon shell.

Benefits of the Invention

According to the present invention, a metal catalyst having carbon shell can be synthesized without a complicated process such as the existing method, and the catalyst can be collected in a single separating process. More specifically, synthesizing process is significantly simplified when compared to the existing method comprising complicated processes, e.g. synthesizing a catalyst→coating organic material→treating by heat. Additionally, a complex can be separated and collected in a single reactor, and thereby synthesizing, supporting and coating of a catalyst are made. Therefore, the production cost can be saved accordingly.

The present invention can provide a uniform catalyst with high durability other than the existing prior art (KR Patent 10-1828175) because the collected Pt-aniline complex is mixed with a support, and Pt-aniline complex is evenly supported to carbon support.

Moreover, the synthesizing does not need further chemical additives such as reducing agent and polymerizing agent.

Particularly, only a catalytic metal can be coated selectively according to the present invention because a ligand attached to the precursor via complex formation can be coated selectively. Therefore, the coated ligand makes the metal particle isolated and thus aggregation of the metal particle can be prohibited.

Consequently, a metal catalyst having carbon shell, synthesized by the present invention, has higher durability than a general catalyst. In addition, the present invention can regulate dimension of defects formed in the carbon shell and thus improve selectivity of a reactant.

Particularly, when Pt is used as a metal in the present invention, the metal catalyst can be used as a catalyst for Pt-based fuel cell, and thus the usage efficiency of Pt is improved and save the cost of fuel cell. As a result, a high-performance fuel cell can be implemented.

Moreover, when another material is used, the present invention can be applied to varied areas requiring high durable catalyst other than in fuel cell.

DETAILED DESCRIPTION OF THE INVENTION

Hereinafter, the present invention will be described in details.

A synthesis method of a metal catalyst having carbon shell according to the present invention, comprising:

a) forming a metal-ligand complex without further chemical additives by mixing a ligand with a metal precursor;

b) separating the metal-ligand complex and collecting the separated metal-ligand complex;

c) supporting the collected metal-ligand complex to a support by mixing the collected metal-ligand complex with the support in a solvent; and d) treating a composite consisting of the metal-ligand complex and the support by heating, wherein synthesizing the catalyst, supporting and coating with carbon are performed together in a single reactor.

The step (a) is to form a metal-ligand complex by mixing a ligand used as a material of carbon shell with a metal precursor used as a metal catalyst, where a metal complex is formed by reaction of the ligand to the metal precursor without further chemical additives.

The ligand can be aniline, F-aniline, Dimethylaniline, p-toluidine and bipyridine-based bidentate amphiphilic ligand of [Formula 1], and preferably a pure liquid aniline monomer.

[Formula 1]

(wherein R is H, halogen, hydroxyl group, carboxyl group, substituted or unsubstituted amino group, nitro group, cyano group, alkyl group with 1 to 20 substituted or unsubstituted carbons, alkoxy group with 1 to 20 substituted or unsubstituted carbons, alkenyl group with 2 to 20 substituted or unsubstituted carbons, alkynyl group with 2 to 20 substituted or unsubstituted carbons, aryl group with 6 to 30 substituted or unsubstituted carbons, aryloxy group with 6 to 30 substituted or unsubstituted carbons, heteroaryl group with 2 to 30 substituted or unsubstituted carbons, or heteroaryloxy group with 2 to 30 substituted or unsubstituted carbons.).

The aniline is a pure aniline monomer, not aniline solution resulting from aniline melted in a solvent or aniline salt such as hydrochloric acid aniline, and exists in status of liquid at room temperature. Additionally, the aniline is used as a source of carbon shell as well as a solvent melting metal salt. The aniline can be a benzene ring having amine group, and sometimes aniline to which benzene ring or alkyl chain is added. Moreover, aniline monomer is an exemplary embodiment for synthesizing a metal catalyst having carbon shell in the present invention, but pure organic materials as a high weigh monomer such as pyrrole and thiophene, which exist in status of liquid at room temperature, can be a substitute for the aniline monomer.

The metal precursor means a reactant (metal salt) which can be a source for a catalytic metal because a metal ion is coordinated with a different material, and any metal precursor, which is capable of reacting with aniline monomer, can be used alone or a combination of 2 or more different metal precursors can be used. For example, the metal precursor, as a metal capable of being a catalyst, can be a metal-salt comprising one or more metal selected from a group consisting of Pt, Pd, Ag, Au, Ni, Co, Fe, Ir and Ru, and preferably a metal comprising Pt, and for example, chloroplatinic acid hexahydrate ($H_2PtCl_6 6H_2O$). In case of Pt, the metal complex is made of the ligand and Pt, and the ligand is altered to carbon shell after heat treatment.

More specifically, in the step (a), a liquid ligand can be mixed with one type of metal precursor or two or more types of different metal precursors, and then stirred at 0 to 90° C. for 3 to 7 hours or more, preferably 5 hours or more.

Additionally, the step (a) can use various published methods for forming metal-ligand complex.

The step (b) is to separate and collect the metal-ligand complex formed in the step (a), for the purpose of forming carbon shell using pure metal-aniline complex by removing ligands not forming metal-ligand complex.

The step (b) comprises dissolving unreacted ligand in a dissolving solution and separating insoluble ligand-metal complex and collecting the ligand-metal complex, and the dissolving solution is preferably hydrochloric acid.

In one embodiment of the present invention, aniline is excessively put when mixing aniline with chloroplatinic acid hexahydrate and thus most of Pt makes complex with aniline. Moreover, unreacted aniline is dissolved by hydrochloric acid and collected through soluble aniline hydrochloride. Consequently, insoluble pure Pt-aniline complex is collected.

In a prior art (Patent 10-1828175), Pt nano particle is grown while carbon shell is formed when carbonization temperature increases, but in the present invention where only Pt-aniline complex is used, Pt nano particle is not grown while carbon shell is completely formed although carbonization temperature increases.

The step (c) is to mix a support with the pure metal-ligand complex separated in the step (b) in a solvent and thus support the metal-ligand complex. The solvent can be an organic solvent such as deionized water or ethanol, acetone and isopropanol.

A material for the support can be carbon material, metallic oxide, polymer or carbide. For example, the material can be carbon black, graphene, carbon nanotube, carbon nanofiber, silica ($SiO_2$), titania ($TiO_2$), zirconium oxide ($ZrO_2$), polyaniline, polypyrrole or silicon carbide (SiC).

More specifically, the mixing in the step (c) can be performed through stirring the support with the metal-aniline complex at 0 to 90° C. for 30 minutes or more.

In a prior art (Patent 10-1828175), a step comprising mixing a support used as a support for a metal-aniline complex in a reactor where the metal complex is formed and supporting the metal complex by ultrasound irradiation is disclosed, and the purpose of the step in the prior art is to support the formed metal complex uniformly on the support by ultrasound irradiation.

In the present invention, however, only Pt-aniline complex is mixed with a support through purification and thus a uniform carbon shell can be manufactured by supporting Pt-aniline complex evenly on the support without ultrasound irradiation.

Additionally, the step (c) can further comprise a process for removing dissolved oxygen through air purging after mixing a support with ligand-metal precursor complex. The air purging can be performed with one or more inert gas selected from a group consisting of $N_2$, Ar, He, Xe, Kr and Ne.

The step (c) can further comprise a step for separating a support where the metal-ligand complex is supported and collecting the support. More specifically, the step is to evaporate a solvent in which a support is mixed with metal-ligand complex, where can be performed by storing the solvent at 10 to 180° C. for 12 to 500 hours without additional chemical processing.

The step (d) is to treat a composite consisting of the metal-ligand complex and the support by heating, where the ligand part, corresponding to a shell, is carbonized by the heat treatment and the metal precursor is reduced. Consequently, the ligand complexed to the metal is altered to carbon shell and thus a core-shell structured catalyst can be collected, which is supported to a support in which the carbon shell coats the catalytic metal.

The heat treatment in the step (d) can be performed through heat processing apparatus such as tube furnace, and the gas used in the heat treatment can be nitrogen-type gas such as nitrogen gas and ammonia (ammonium) gas alone or a combination thereof.

The temperature in the heat treatment is suitably 400 to 1000° C. considering efficiency of the heat treatment and status of the metal, and time for the heat treatment can be 30 minutes to 24 hours.

The synthesis according to the present invention can be completed after cooling the resulting materials treated by heating to room temperature by a proper method.

In another aspect of the present invention, a metal catalyst having carbon shell synthesized according the synthesis method of the present invention described above is provided.

The metal catalyst having carbon shell in the present invention has excellent durability and thus can be used as a metal catalyst for electrochemical reaction more specifically a metal catalyst for facilitating oxygen reduction reaction (ORR) in a polymer electrolyte membrane fuel cell (PEMFC).

The metal catalyst having carbon shell in the present invention has selectivity of reactants (oxygen and methanol) and thus can be used as a metal catalyst for electrochemical reaction, particularly a metal catalyst improving performance of direct methanol fuel cell (DMFC) by prohibiting mixed potential caused by methanol cross-over in DMFC.

In one embodiment of the present invention, when the metal is Pt, the present invention can be applied to fuel cell requiring high durability and thus show an outstanding efficiency. Additionally, when another metal except Pt is used, the present invention can be applied to varied areas requiring a catalyst.

Example: Synthesis of a Metal Catalyst with Carbon Shell

Synthesis of a Metal Catalyst is Performed in 2 Steps.
1) Formation of Pt Aniline Complex The first step was one spot synthesis where 0.2 g $H_2PtCl_6 6H_2O$ was mixed with 30 ml pure aniline (liquid state) in 50 ml glass vial and stirring was made at room temperature for 5 hours and thus Pt aniline complex was formed.

The color of aniline solution mixed with Pt precursor was becoming gradually purple, which indicates Pt-aniline complex began to be formed. After 5 hours, Pt-aniline solution became deep purple, which indicates Pt ion was completely bonded to aniline ligand.

Additionally, unreacted aniline was dissolved in 0.2M HCl solution and Pt-aniline complex was separated through collecting soluble hydrochloride using a separation flask. Organic layers were dissolved by HCl till insoluble Pt-aniline complex powder (deep purple) was produced. Synthesized Pt-aniline complex was dissolved well in ethanol.

2) Manufacture and Calcination of CNF/Pt-Aniline Complex

Next step is to manufacture CNF/Pt-aniline complex and calcinate the complex in varied temperature.

CNF was refluxed with 13M Con. $HNO_3$ after washing it with 1M $HNO_3$. It was treated with $HNO_3$ for 24 hours for the purpose of metal impurities and functionalization and then was washed with water until pH reaches to be neutral. After acid treatment, 200 mg CNF were mixed with 200 mg Pt-aniline complex in ethanol medium.

After evaporating ethanol completely, Pt-aniline/CNF complex was sintered at 600° C., 700° C. and 900° C. in $N_2$ atmosphere for 1 hour through tubular furnace. Heating rate of Pt-aniline/CNF complex was fixed at 10° C./min.

N-doping carbon shell synthesized successfully on Pt nano particles supported to CNF was named as NC@Pt/CNF_6.1, NC@Pt/CNF_7.1, and NC@Pt/CNF_9.1 depending on sintering conditions, which are generally called as NC@Pt/CNF.

Experiment: Examination of Properties of Synthesized Pt Catalyst Having Carbon Shell (1) UV-Vis Spectra FIG. 1(a) is a graph monitoring reaction of $H_2PtCl_6 6H_2O$ and aniline by UV-Vis spectrometer.

As a first step, $H_2PtCl_6 6H_2O$ was mixed with aniline and stirred consecutively in magnetic stirrer, and then 500 µl reacted mixture was dissolved in 2 ml ethanol in predetermined time intervals. Absorbance spectrum of pure ethanol was recorded as baseline. Absorbance at 230 nm and 290 nm correspond to d-d* and n-d* transmission of aniline.

Figure 1:
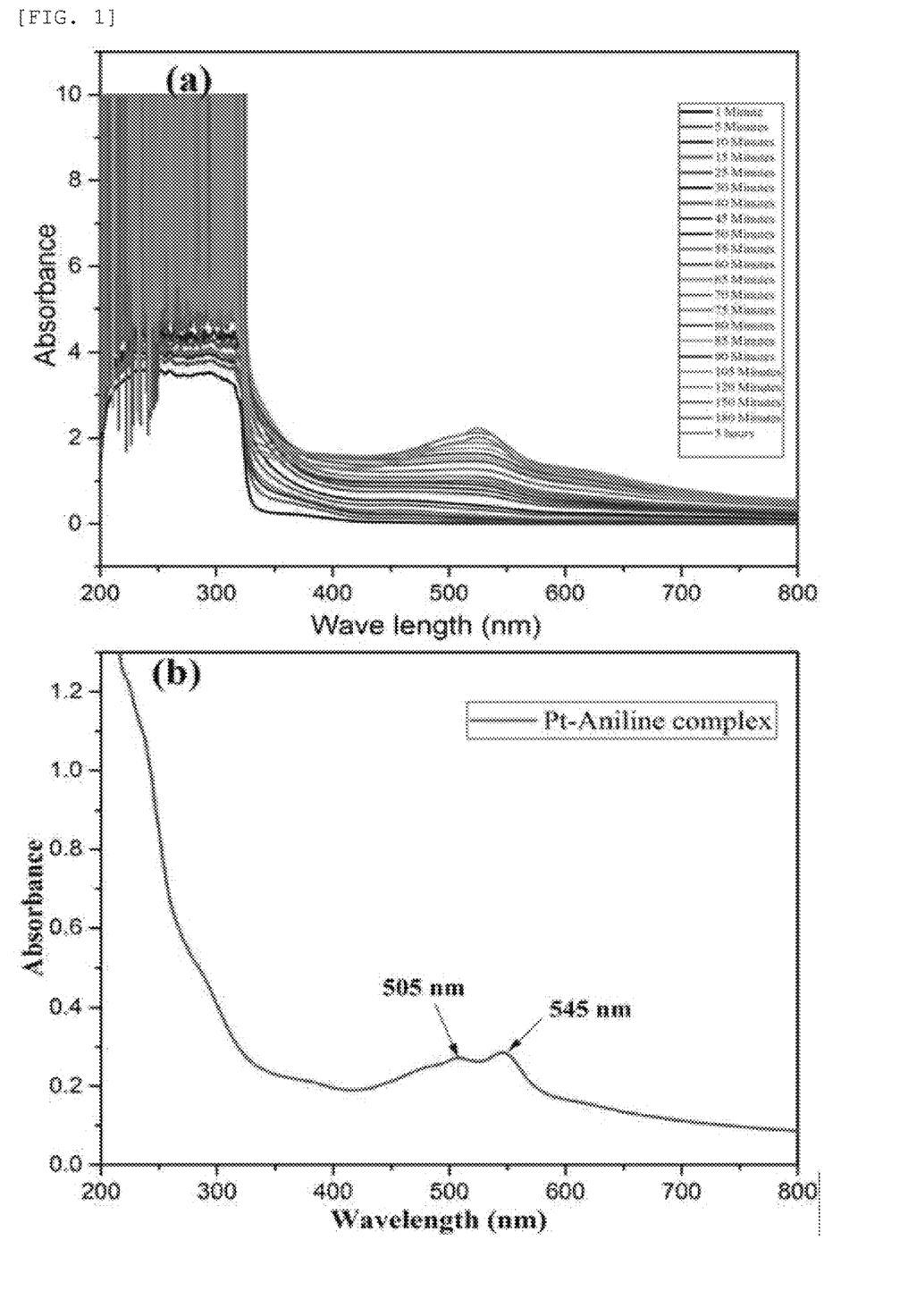
FIG. 1 depicts (a) UV-Vis spectrum of Pt-aniline complex formation monitored in $H_2PtCl_6 6H_2O$ and aniline (b) UV-Vis spectrum of Pt-aniline complex in ethanol.

Absorbance band of Pt-aniline complex at 545 nm corresponds to metal-ligand charge transmission and another band at 505 nm corresponds to d-d transmission of metal complex in FIG. 1(b). Such situations indicate formation of Pt-aniline complex is spontaneously made at room temperature.

(2) Inert Atmosphere Thermogravimetric Analysis

Figure 2:
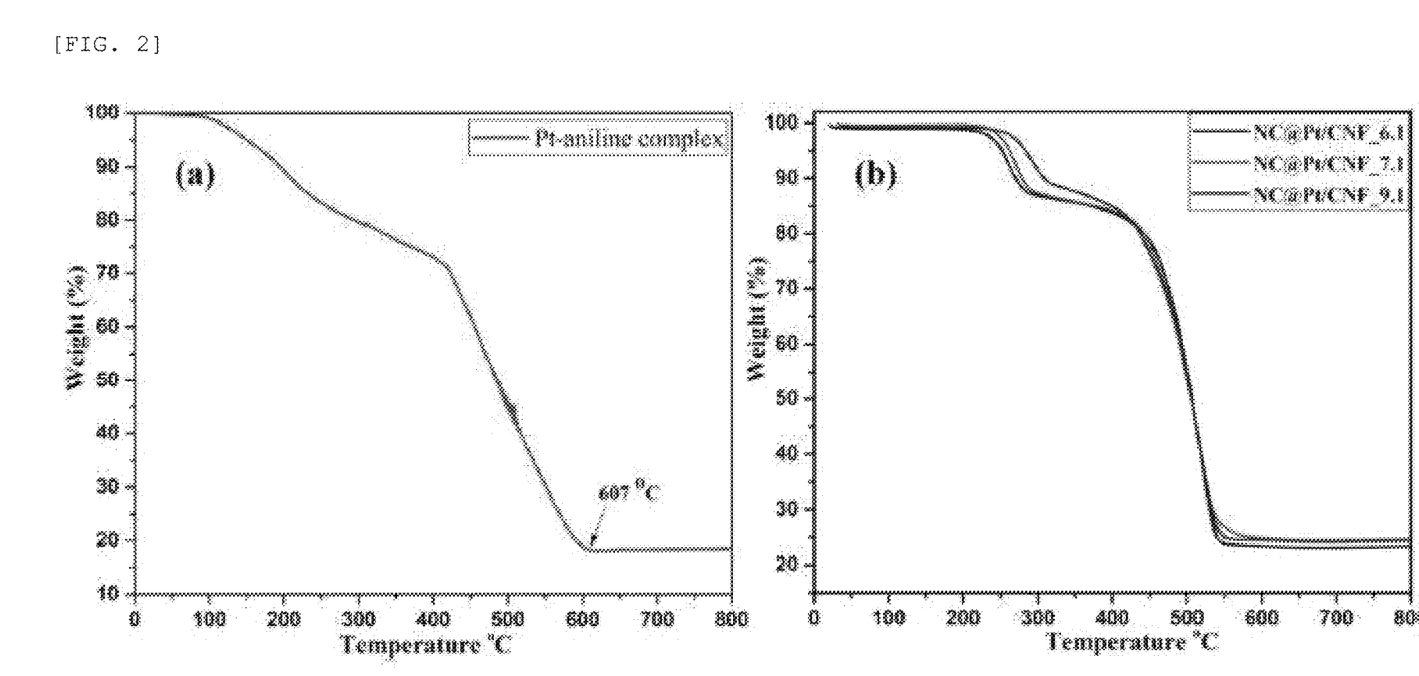
FIG. 2 depicts thermo gravimetric analysis (TGA) graph of (a) Pt-aniline complex at a heating rate of 3° C. $min^{-1}$ in $N_2$ atmosphere (b) NC@Pt/CNF_6.1, NC@Pt/CNF_7.1, NC@Pt/CNF_9.1 at a heating rate of 3° C. $min^{-1}$ in $O_2$ atmosphere.

TGA results of Pt-aniline complex were depicted in FIG. 2(a).

Pt-aniline complex was decomposed until 607° C. The weight loss till 200° C. corresponded to aniline monomers, and the weight loss in 200~400° C. corresponded to unreacted aniline monomers or Pt-bonded chloride, and the weight loss in 400~600° C. corresponded to bond between Pt metal and aniline-based ligand.

FIG. 2(b) is a TGA graph of NC@Pt/CNF sintered at 600° C., 700° C. and 900° C. with rate of 3° C./min in $O_2$ atmosphere.

There are two steps in weight loss from NC@Pt/CNF. The first weight loss in 225~325° C. corresponds to carbon shell covering Pt nano crystalline surface. TGA curve in the region explains definitely heat stability of graphitized carbon shell, NC@Pt/CNF sintered in 600~900° C. The second weight loss corresponds to carbon nano fiber (CNF) having identical heat stability.

(3) Electron Microscope Pictures

Figure 3:
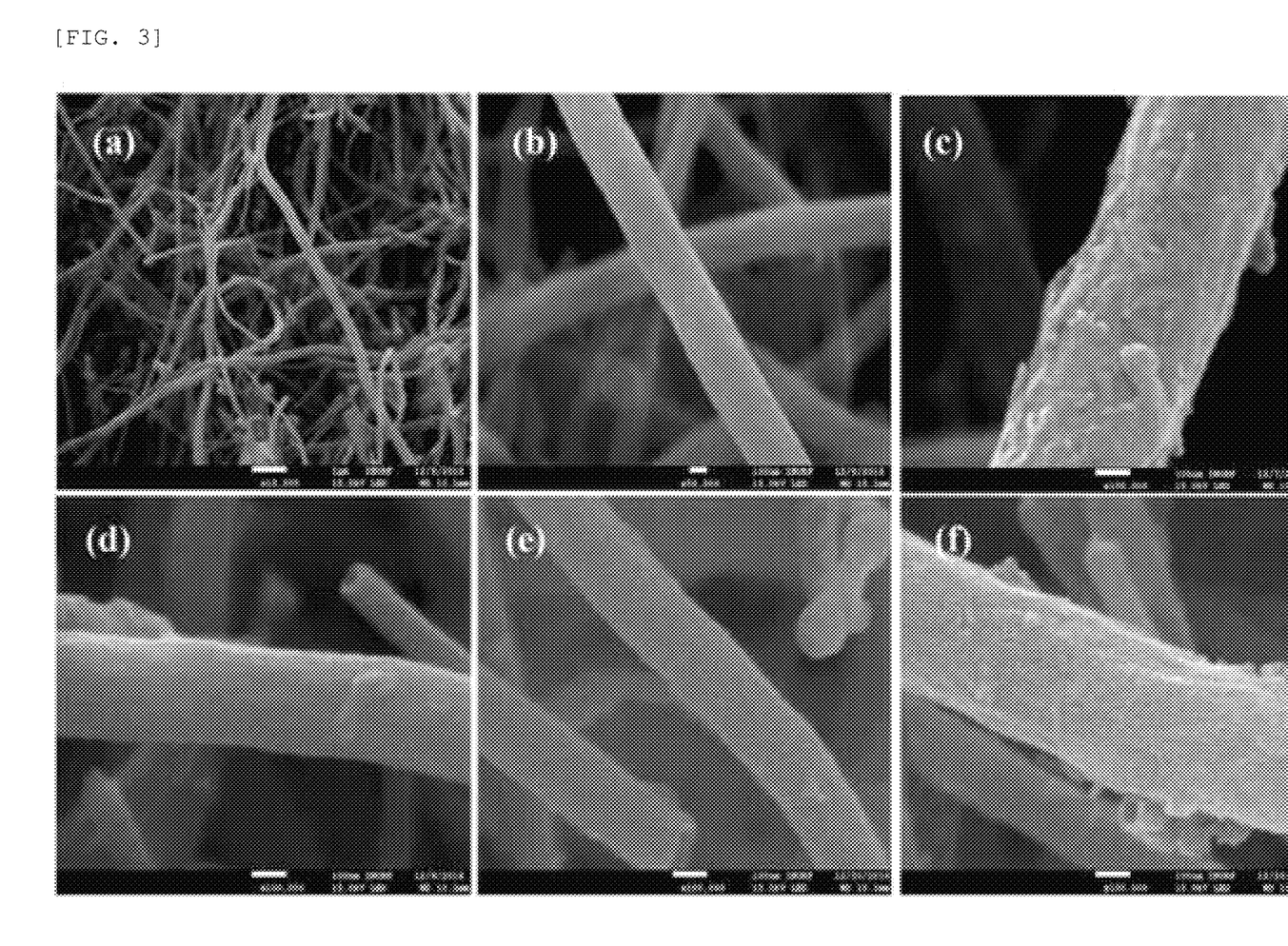
FIG. 3 depicts FE-SEM image of (a, b) CNF (c) CNF coated by Pt-aniline complex (d) NC@Pt/CNF_6.1 (e) NC@Pt/CNF_7.1 (f) NC@Pt/CNF_9.1.

FE-SEM image of Pt catalyst having carbon shell, synthesized and collected according to examples are depicted in FIG. 3.

In FIG. 3, Pt-aniline complex was adsorbed well on surface of CNF (FIG. 3(C)), and thus helped to form N-doping carbon coated Pt on CNF at varied carbonization temperatures (FIG. 3(d)-(f)).

Figure 4:
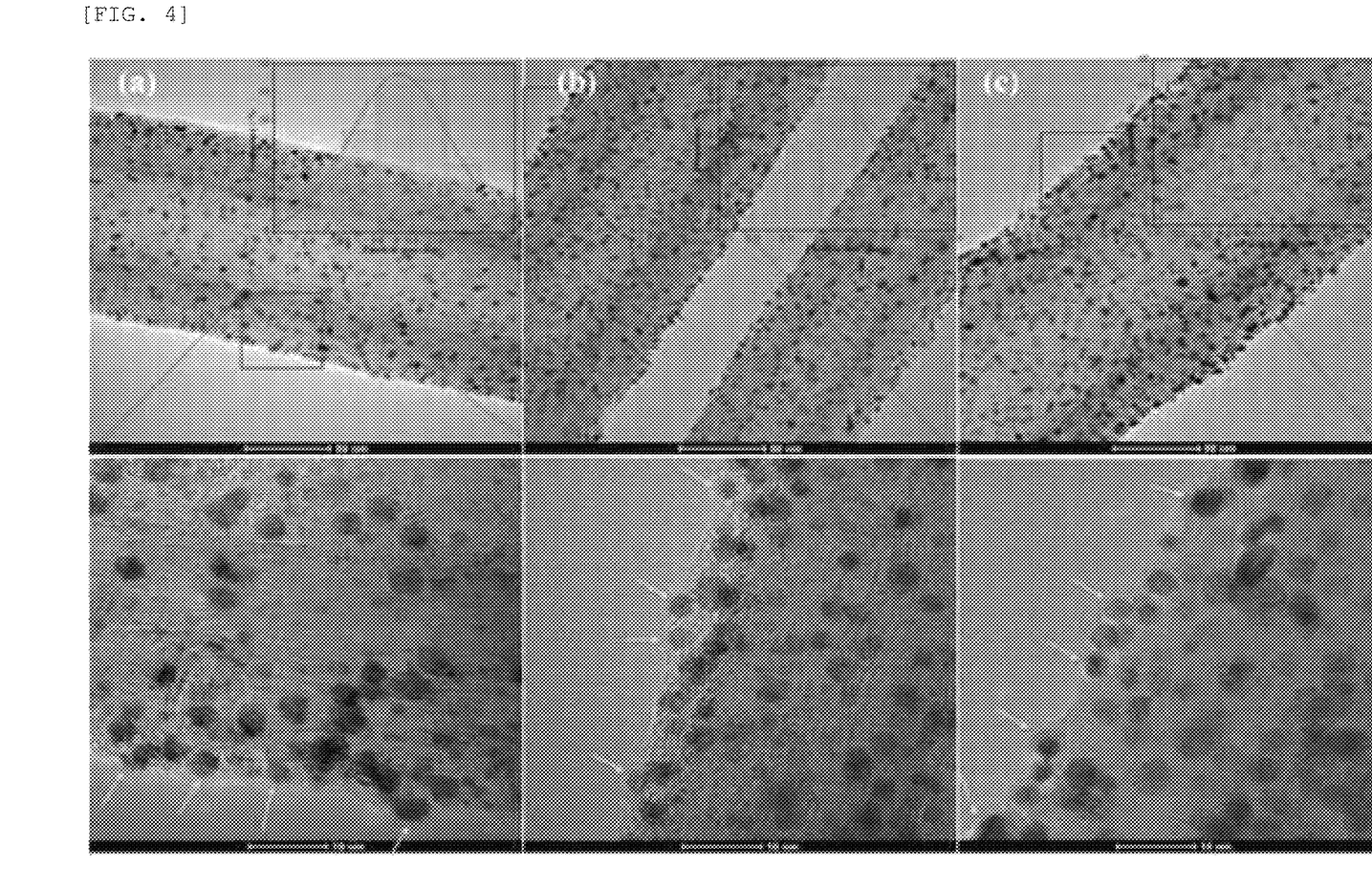
FIG. 4 depicts FE-TEM image of electrode catalyst represented with low and high magnification (a) NC@Pt/CNF_6.1 (b) NC@Pt/CNF_7.1 (b) NC@Pt/CNF_9.1.

FIG. 4 depicts FE-TEM images of electrode catalysts of NC@Pt/CNF_6.1, NC@Pt/CNF_7.1, and NC@Pt/CNF_9.1. Pt was deposited uniformly and then each of Pt nano particles coated N-doped carbon shell. Average particle size of Pt in NC@Pt/CNF_6.1, NC@Pt/CNF_7.1, and NC@Pt/CNF_9.1 is 3.2, 3.7 and 4.0 nm respectively, which indicates Pt particle was not aggregated due to N-doping carbon shell during carbonization proceeded in 600~900° C.

Figure 5:
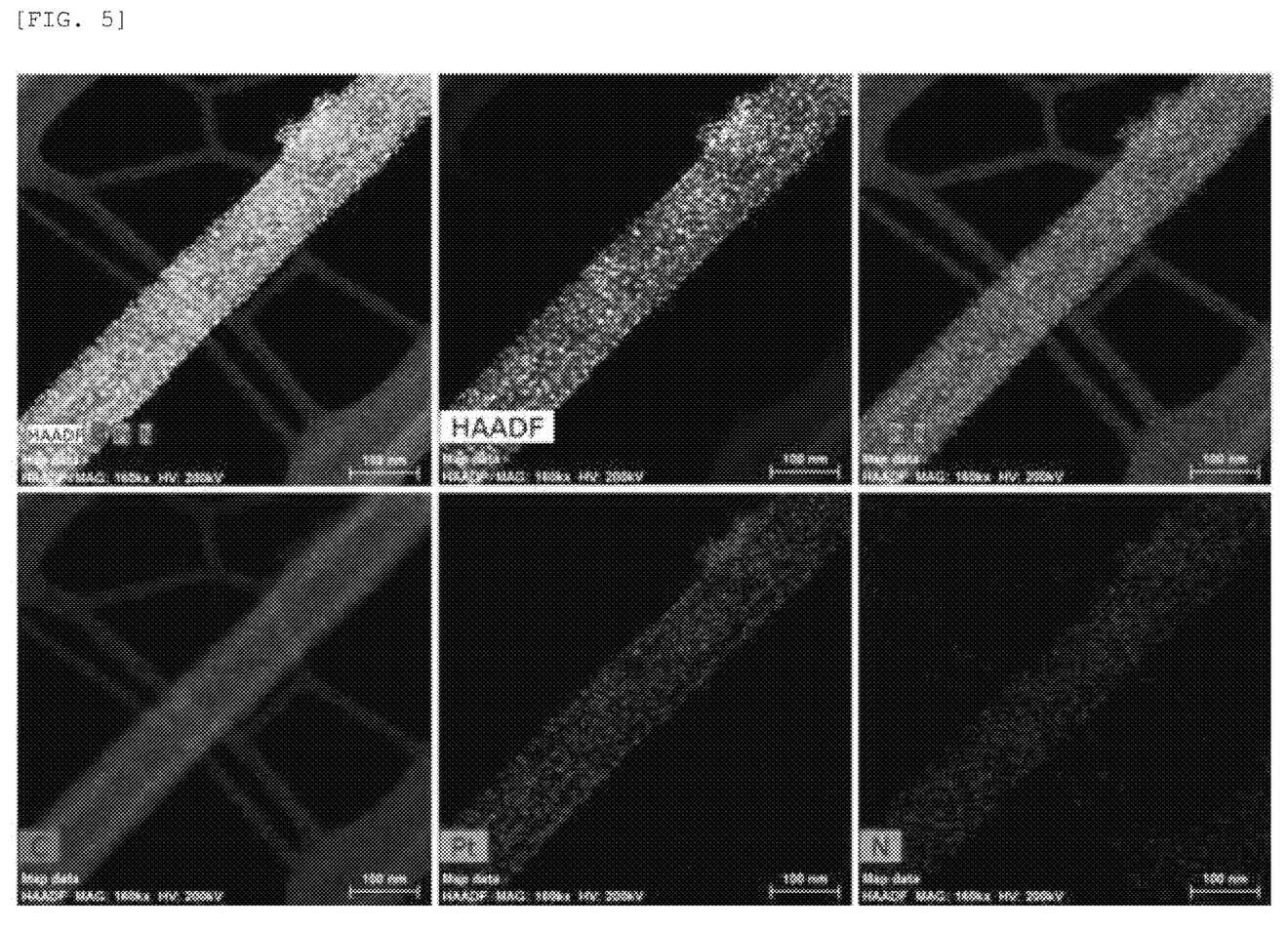
FIG. 5 depicts a HAADF-STEM mapping image of NC@Pt/CNF_9.1.
Figure 6:
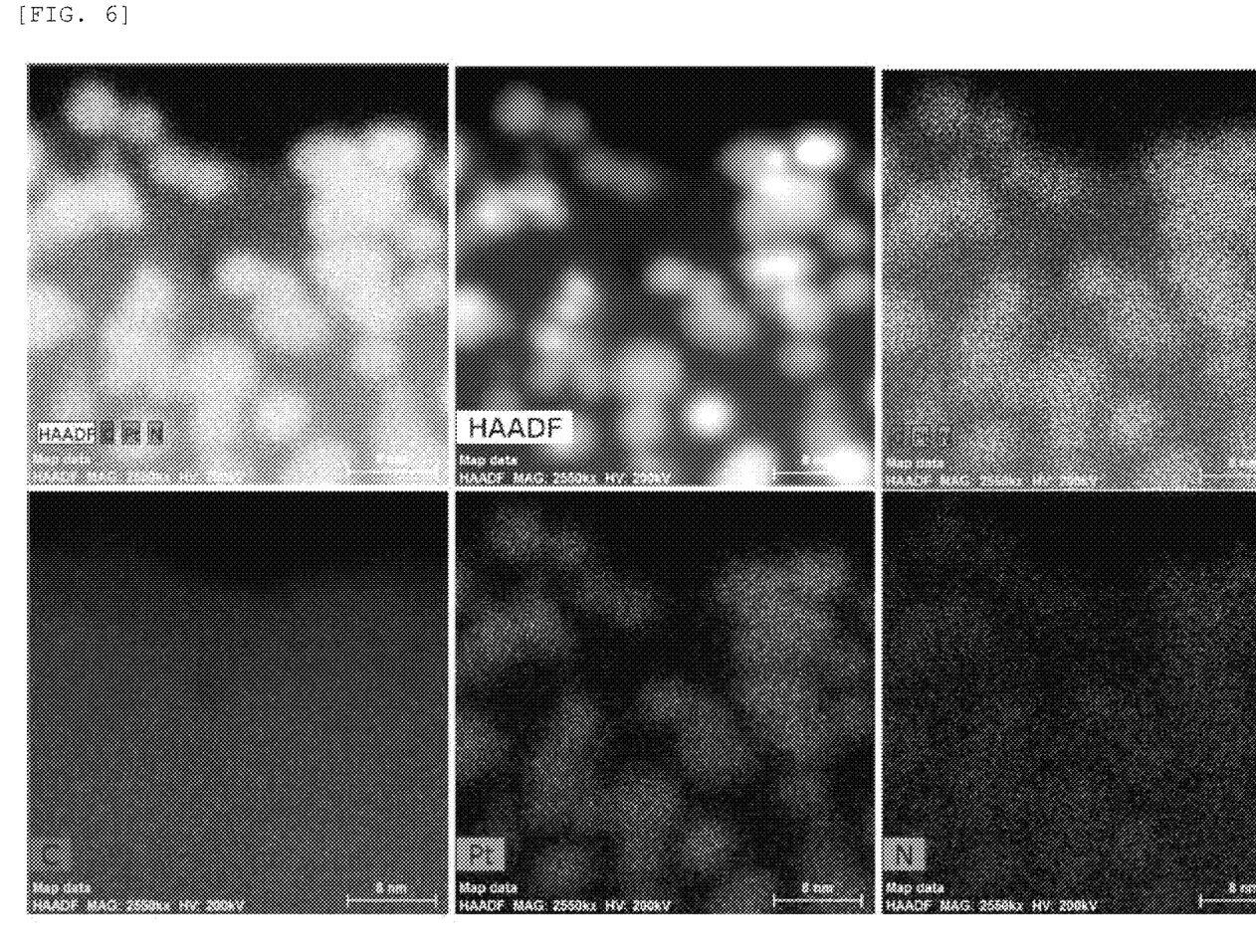
FIG. 6 depicts a HAADF-STEM mapping image of NC@Pt/CNF_9.1 with high magnification.

Mapping images of HAADF-STEM of a single carbon nano fiber (FIG. 5) shows clear pictures of uniform distribution of Pt metal coated with N-doping carbon on surface of CNF. N-doping in carbon shell was identified in HAADF-STEM mapping images of NC@Pt/CNF_9.1 with high magnification depicted in FIG. 6. Nitrogen distribution was overlapped to Pt distribution.

(4) X-Ray Diffraction Analysis

Figure 7:
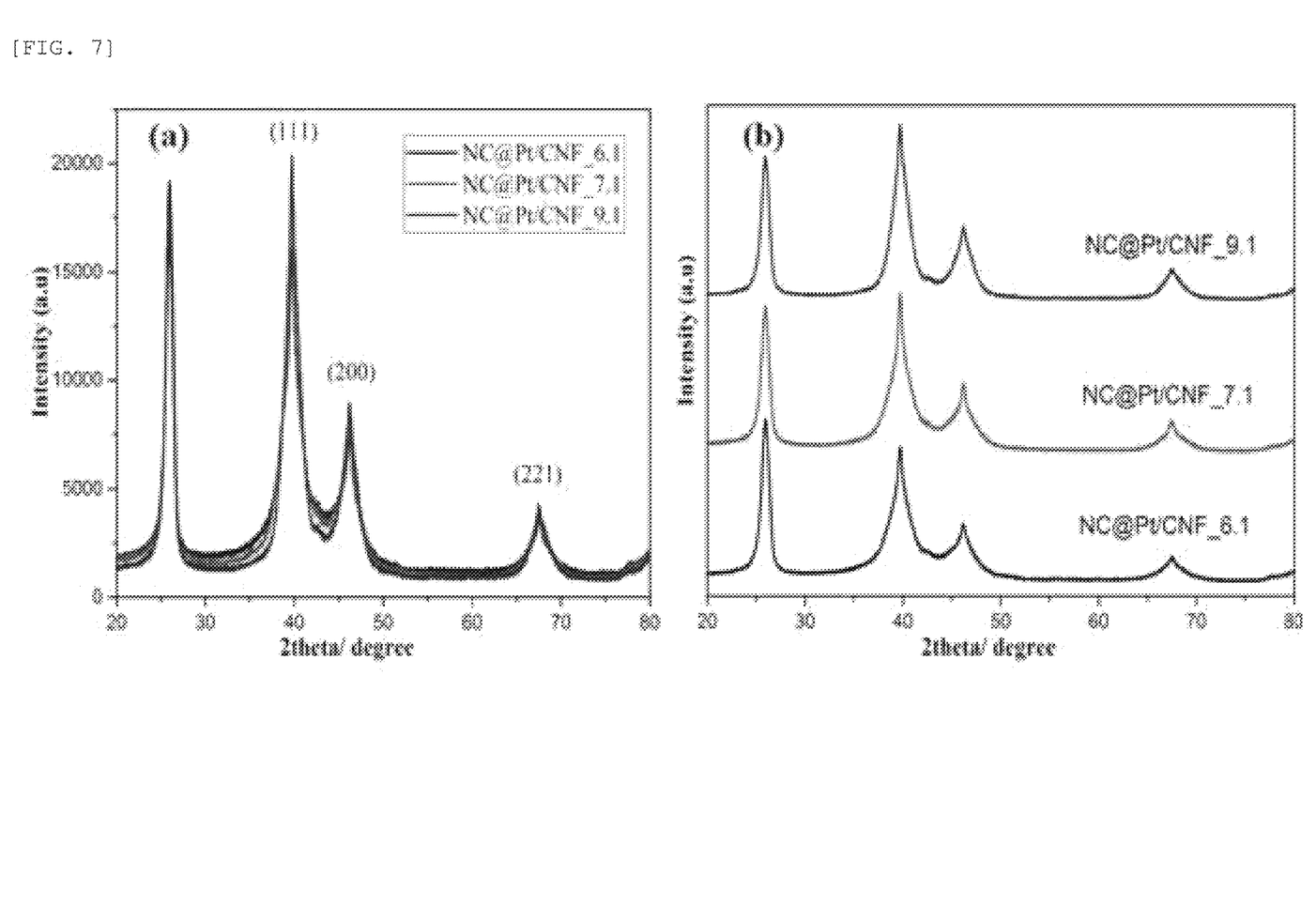
FIG. 7 depicts XRD of NC@Pt/CNF_6.1, NC@Pt/CNF_7.1, NC@Pt/CNF_9.1.

Crystal orientation of various NC@Pt/CNF were varified through X-ray diffraction analysis and the results were depicted in FIG. 7. Pt crystallite showed 39.6°, 46.15° and 67.5° diffraction peak respectively in NC@Pt/CNF, and 25.9° correspond to graphited carbon.

Particle size of Pt was calculated using Scherrer formula. In FIG. 7(a), NC@Pt/CNF samples carbonized in 600° C., 700° C. and 900° C. did not show a significant change of diffraction pattern and thus the role of carbon shell to Pt aggregate was identified. Average particle size of NC@Pt/CNF_6.1, NC@Pt/CNF_7.1, and NC@Pt/CNF_9.1 was 5.4 nm, 5.6 nm and 5.0 nm respectively.

(5) Durability Test in a Catalyst

Conditions for durability test in a catalyst of a half cell for guaranteeing objectivity of experimental results were as follows.

Durability of Pt/C electrochemical catalyst and NC@Pt/CNF electrochemical catalyst was examined by accelerated durability test, in which it was polarized consistently at 100 mV $s^{-1}$ of scan rate during 10000 potential cycle between 0.605~1.05V in $N_2$ saturated 0.1M $HClO_4$ electrolyte.

Figure 8:
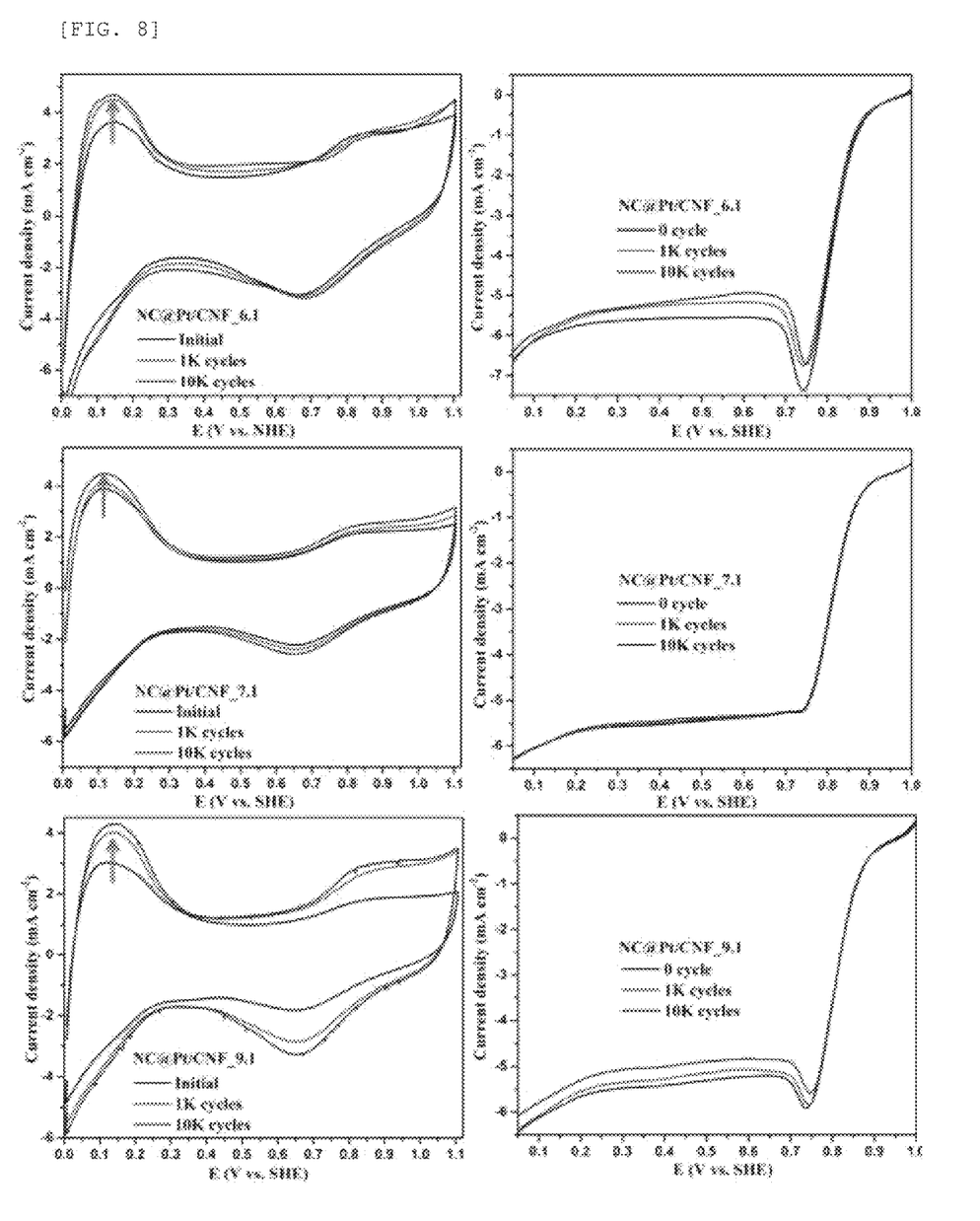
FIG. 8. depicts cyclic voltammograms (left) and linear sweep polarization (right) of electrode catalyst of NC@Pt/CNF_6.1, NC@Pt/CNF_7.1, NC@Pt/CNF_9.1 produced during ADT.
Figure 9:
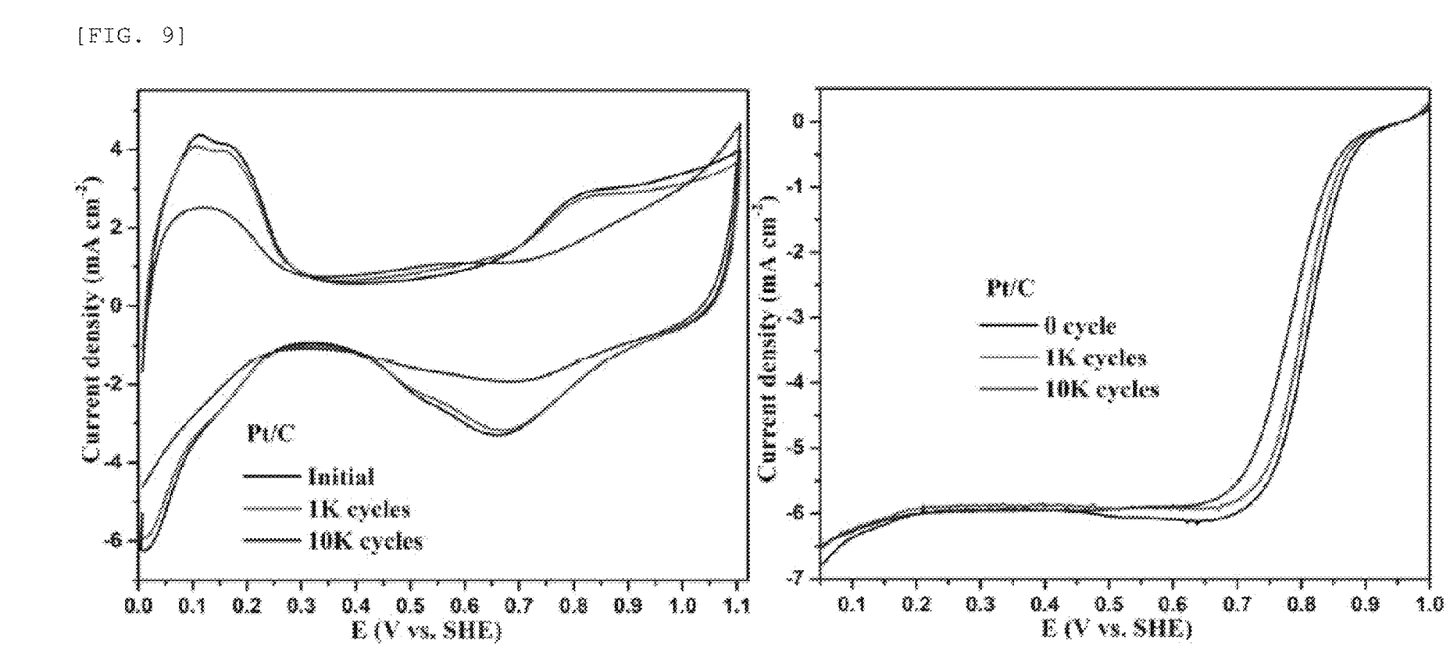
FIG. 9. depicts cyclic voltammograms (left) and linear sweep polarization (right) of Pt/C electrical catalyst during ADT.

FIG. 8 depicts cyclic voltammetry (CV) curve and linear sweep voltammetry (LSV) curve of NC@Pt/CNF produced during ADT. ECSA and $E_{1/2}$ changes were monitored at initial stage, 1000 and 10000 potential cycle. FIG. 9 depicts CV curve and LSV curve of Pt/C during ADT. After ADT, 31 mV of $E_{1/2}$ value and 47.8% loss of ECSA were observed in commercial Pt/C.

Interesting results in ADT of NC@Pt/CNF were recorded, and NC@Pt/CNF was activated during 10000 cycles and ECSA was increased after ADT. NC@Pt/CNF_6.1 showed 6 mV of $E_{1/2}$ loss and 12.7%(42.0 $m^2$ $g^{-1}$ Pt) increase of ECSA. NC@Pt/CNF_7.1 and NC@Pt/CNF_9.1 showed zero loss of ORR observed in both of catalysts, 8.5%(42.4 $m^2$ $g^{-1}$ Pt) and 30.6% (38.8 $m^2$ $g^{-1}$ Pt) increase of ECSA respectively. The results clearly described a role of N-doping carbon shell for improving stability of NC@Pt/CNF electrode catalyst.

Figure 10:
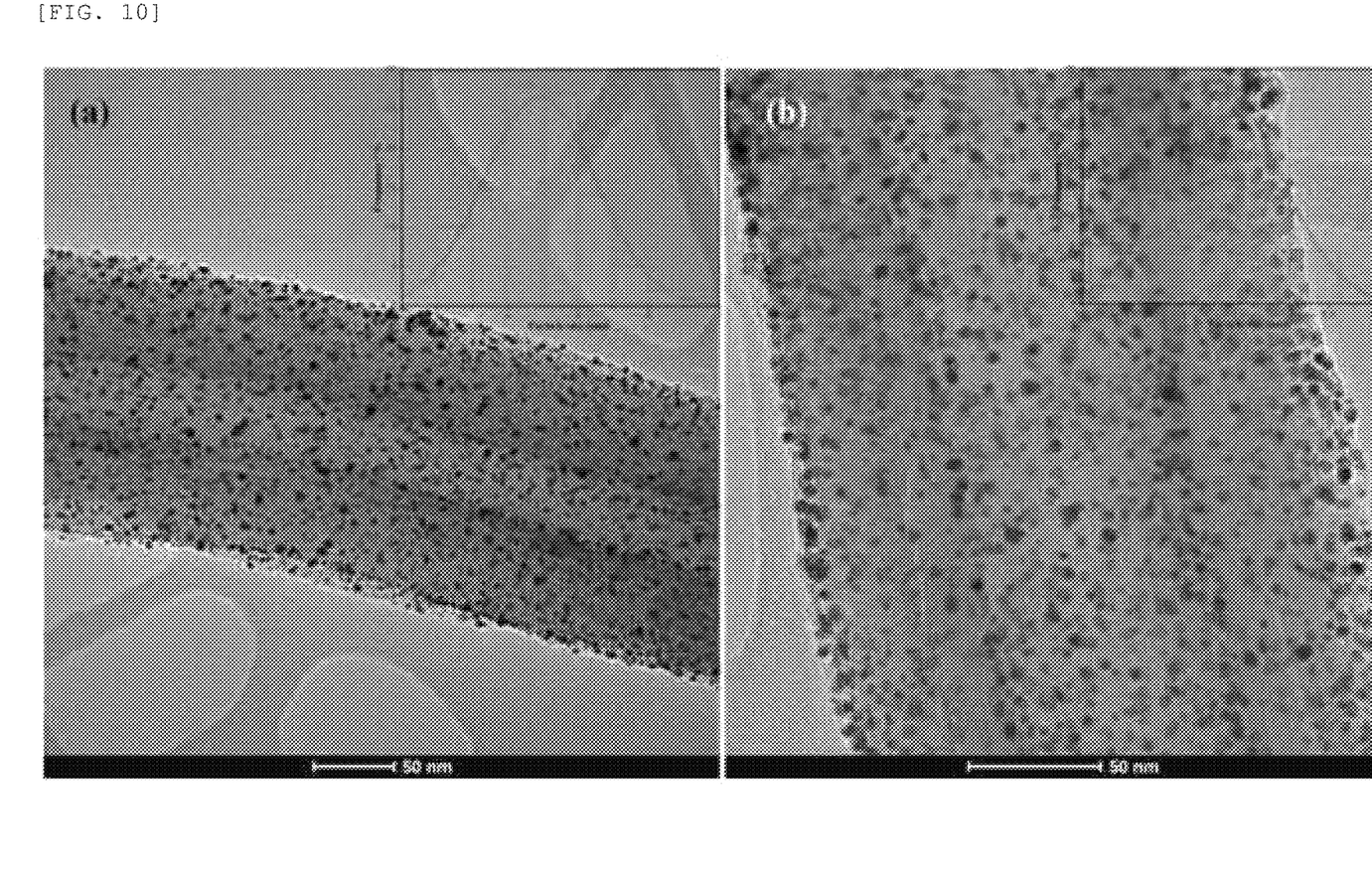
FIG. 10. depicts FE-TEM image of (a) NC@Pt/CNF_6.1, (b) NC@Pt/CNF_9.1 after ADT.

FE-TEM was performed for examining Pt stability in NC@Pt/CNF_6.1 and NC@Pt/CNF_9.1 after ADT. FIG. 10 depicts FE-TEM images of –NC@Pt/CNF_6.1 catalyst and NC@Pt/CNF_9.1 catalyst polarized in the Pt oxide formation and reduction region after 10000 potential cycle.

Pt particle in NC@Pt/CNF_6.1 electrochemical catalyst were aggregated more than in NC@Pt/CNF_9.1 electrochemical catalyst. Average Pt particle size of NC@Pt/CNF_6.1 and NC@Pt/CNF_9.1 in the graph was 4.5 nm and 3.9 nm respectively. The results clearly described that Pt dissolution and Ostwald ripening were inhibited for a long time by more highly carbonized carbon shell.

Figure 11:
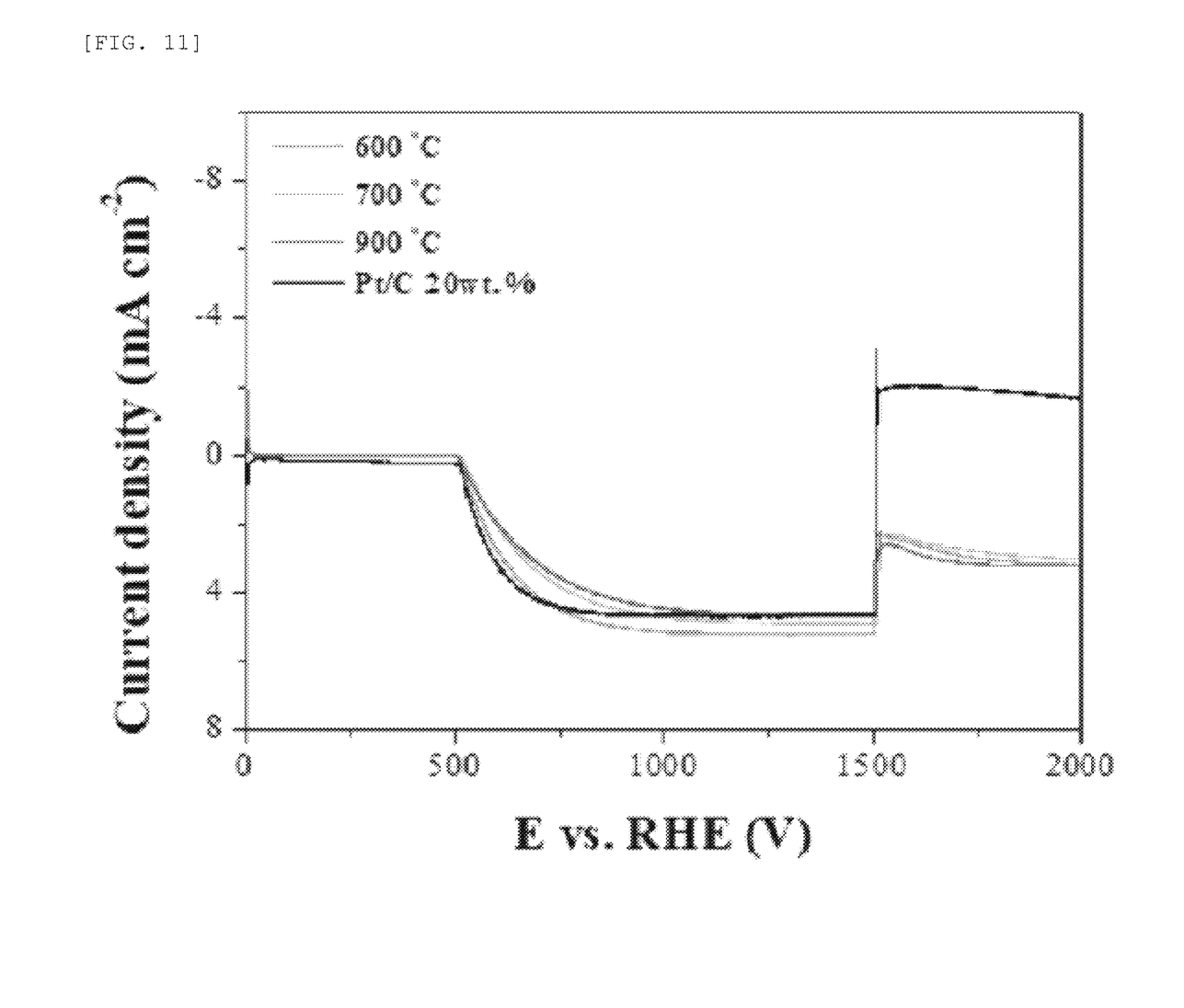
FIG. 11. depicts oxygen reduction and methanol oxidation in NC@Pt/CNF_6.1, NC@Pt/CNF_7.1 and NC@Pt/CNF_9.1.

Experiment: Examination of Selectivity of Carbon Shell (1) Experiments of Oxygen Reduction and Methanol Oxidation Experiments of oxygen reduction and methanol oxidation were performed for identifying selectivity of carbon shell to reactants. Selectivity to oxygen and methanol proved that the catalyst in the present invention can be applied to cathode catalyst of DMFC. FIG. 11 depicts the results of oxygen reduction and methanol oxidation when oxygen and methanol exits together. Any of gas was not blew into until 500-second and oxygen gas was supplied at 500-second. As described in FIG. 11, the flow of oxygen reduction current was identified.

3M of methanol was inserted with oxygen at 1500-second. As described in FIG. 11, methanol oxidation current was flowed in Pt/C while reduction current was flowed in all of NC@Pt/CNF_6.1, NC@Pt/CNF_7.1, and NC@Pt/CNF_9.1.

The reason why such results were shown is because methanol did not contact Pt catalyst due to carbon shell. In other words, the carbon shell has selectivity, passing oxygen but blocking methanol, and thus mixed potential issue caused by methanol coming through methanol crossover in DMFC can be resolved.

CONCLUSION

The present invention focuses on resolving durability issue of Pt-based electrode catalyst in a fuel cell under acid environment and imposing reactant selectivity.

Pt electrochemical catalyst, which was supported on hollow CNF as well as coated with N-doping carbon shell, was synthesized by a simple synthesis process where Pt-aniline complex was formed and CNF deposited by Pt-aniline complex was carbonized.

Analysis of XRD and FE-TEM described contribution of carbon shell carbonized for regulating Pt nano particle size sintered in 600° C., 700° C. and 900° C.

ECSA value in NC@Pt/CNF was lower than Pt/C due to carbonized carbon shell.

However, NC@Pt/CNF_6.1 showed better performance of 16 mV in ORR than Pt/C.

NC@Pt/CNF_9.1 show zero loss in ORR than Pt/C, and thus showed a perfect durability.

Carbon shell showed selectivity to oxygen in oxygen reduction under methanol.

The present invention describes a role of N-doping carbon shell and the importance thereof for prohibiting Pt dissolution and Ostwald ripening.

Carbonized carbon shell inhibited Pt transition on carbon support in the present invention.

Carbon shell showed selectivity to oxygen by passing the oxygen while blocking methanol in the present invention.

What is claimed is:

1. A synthesis method of a metal catalyst having carbon shell, comprising:
   a) forming an insoluble metal-ligand complex without further chemical additives by mixing a ligand with a metal precursor;
   b) dissolving unreacted ligand in a dissolving solution, separating the insoluble metal-ligand complex and collecting the separated metal-ligand complex, and also collecting the dissolved solution;
   c) supporting the collected metal-ligand complex to a support by mixing the collected metal-ligand complex with the support in a solvent; and
   d) treating a composite consisting of the metal-ligand complex and the support by heating.

2. The synthesis method of the claim 1, wherein the metal precursor in the step (a) is a metal-salt.

3. The synthesis method of the claim 2, wherein the metal-salt comprises one or more metal selected from a group consisting of Pt, Pd, Ag, Au, Ni, Co, Fe, Ir and Ru.

4. The synthesis method of the claim 3, wherein the metal-salt comprises Pt.

5. The synthesis method of the claim 4, wherein the metal-salt precursor is chloroplatinic acid hexahydrate ($H_2PtCl_6 6H_2O$).

6. The synthesis method of the claim 1, wherein the ligand is one selected from a group consisting of aniline, F-aniline, Dimethylaniline, p-toluidine and bipyridine-based bidentate amphiphilic ligand of [Formula 1]

[Formula 1]

(wherein R is H, halogen, hydroxyl group, carboxyl group, substituted or unsubstituted amino group, nitro group, cyano group, alkyl group with 1 to 20 substituted or unsubstituted carbons, alkoxy group with 1 to 20 substituted or unsubstituted carbons, alkenyl group with 2 to 20 substituted or unsubstituted carbons, alkynyl group with 2 to 20 substituted or unsubstituted carbons, aryl group with 6 to 30 substituted or unsubstituted carbons, aryloxy group with 6 to 30 substituted or unsubstituted carbons, heteroaryl group with 2 to 30 substituted or unsubstituted carbons, or heteroaryloxy group with 2 to 30 substituted or unsubstituted carbons.).

7. The synthesis method of the claim 1, wherein the step (a) comprises stirring after mixing the ligand with the metal precursor.

8. The synthesis method of the claim 1, wherein the dissolving solution is HCl.

9. The synthesis method of the claim 1, wherein the support in the step (c) is made of carbon material, metallic oxide, polymer or carbide capable of supporting a catalytic metal.

10. The synthesis method of the claim 9, wherein the support is made of carbon black, graphene, carbon nanotube, carbon nanofiber, silica ($SiO_2$), titania ($TiO_2$), zirconium oxide ($ZrO_2$), polyaniline, polypyrrole or silicon carbide (SiC).

11. The synthesis method of the claim 1, wherein the step (c) further comprises separating a support where the synthesized metal-ligand complex is supported and collecting the support.

12. The synthesis method of the claim 11, wherein the separating is performed by a centrifuge and the collecting is performed by a membrane filter.

13. The synthesis method of the claim 1, wherein the treating in the step (d) comprises inpouring a gas, wherein the gas comprises nitrogen.

14. The synthesis method of the claim 13, wherein the gas is one or more selected from a group consisting of nitrogen gas and ammonia gas.

15. The synthesis method of the claim 10, wherein the treating in the step (d) is performed at 400 to 1000° C. for 30 minutes to 24 hours.

* * * * *